United States Patent
Usova et al.

(10) Patent No.: US 10,655,041 B2
(45) Date of Patent: May 19, 2020

(54) WELL TREATMENTS FOR DIVERSION OR ZONAL ISOLATION

(71) Applicant: Schlumberger Technology Corporation, Sugar Land, TX (US)

(72) Inventors: Zinaida Yurievna Usova, Tomsk (RU); Shitong S. Zhu, Waban, MA (US); Bruno Lecerf, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/526,848

(22) PCT Filed: Nov. 10, 2015

(86) PCT No.: PCT/US2015/059971
§ 371 (c)(1),
(2) Date: May 15, 2017

(87) PCT Pub. No.: WO2016/077359
PCT Pub. Date: May 19, 2016

(65) Prior Publication Data
US 2017/0342306 A1    Nov. 30, 2017

Related U.S. Application Data

(60) Provisional application No. 62/080,002, filed on Nov. 14, 2014.

(51) Int. Cl.
*C09K 8/03* (2006.01)
*C09K 8/516* (2006.01)

(52) U.S. Cl.
CPC ............... *C09K 8/03* (2013.01); *C09K 8/516* (2013.01); *C09K 2208/08* (2013.01); *C09K 2208/28* (2013.01)

(58) Field of Classification Search
CPC . C09K 8/03; C09K 8/51; C09K 8/516; C09K 8/42; C09K 8/426; C09K 2208/08;
(Continued)

(56) References Cited

U.S. PATENT DOCUMENTS

| | | |
|---|---|---|
| 4,848,467 A | 7/1989 | Cantu et al. |
| 4,957,165 A | 9/1990 | Cantu et al. |

(Continued)

FOREIGN PATENT DOCUMENTS

| | | |
|---|---|---|
| WO | 2009088317 A1 | 7/2009 |
| WO | 2014065974 A1 | 5/2014 |
| WO | 2014065975 A1 | 5/2014 |

OTHER PUBLICATIONS

Yang et al., "Stabilization of poly(lactic acid) by polycarbodiimide", Polymer Degradation and Stability, vol. 93, 2008, pp. 1923-1929.
(Continued)

*Primary Examiner* — Crystal J Miller

(57) ABSTRACT

Methods of treating a subterranean formation penetrated by a well bore, by providing a treatment fluid comprising non-homogeneous particulates including a degradable material and a stabilizer; by introducing the treatment fluid into the well bore; and by creating a plug with the treatment fluid.

17 Claims, 3 Drawing Sheets

(58) Field of Classification Search
CPC ...... C09K 2208/28; E21B 33/13; E21B 43/26; E21B 43/261
See application file for complete search history.

(56) References Cited

U.S. PATENT DOCUMENTS

| | | | |
|---|---|---|---|
| 4,986,355 A | 1/1991 | Casad et al. | |
| 5,484,881 A | 1/1996 | Gruber et al. | |
| 5,979,557 A | 11/1999 | Card et al. | |
| 6,239,183 B1 | 5/2001 | Farmer et al. | |
| 6,435,277 B1 | 8/2002 | Qu et al. | |
| 6,506,710 B1 | 1/2003 | Hoey et al. | |
| 6,703,352 B2 | 3/2004 | Dahayanake et al. | |
| 7,060,661 B2 | 6/2006 | Dobson et al. | |
| 7,303,018 B2 | 12/2007 | Cawiezel et al. | |
| 7,510,009 B2 | 3/2009 | Cawiezel et al. | |
| 7,784,541 B2 | 8/2010 | Hartman et al. | |
| 8,167,043 B2 | 5/2012 | Willberg et al. | |
| 8,714,249 B1 | 5/2014 | Tang | |
| 8,905,133 B2 | 12/2014 | Potapenko et al. | |
| 9,297,476 B2 | 3/2016 | Gassmann et al. | |
| 9,322,260 B2 | 4/2016 | Potapenko et al. | |
| 9,534,163 B2 | 1/2017 | Abe et al. | |
| 2006/0175059 A1 | 8/2006 | Sinclair et al. | |
| 2008/0000638 A1 | 1/2008 | Burukhin et al. | |
| 2008/0108524 A1* | 5/2008 | Willberg | C09K 8/035 507/225 |
| 2008/0196896 A1 | 8/2008 | Bustos et al. | |
| 2008/0280788 A1 | 11/2008 | Parris et al. | |
| 2008/0280790 A1 | 11/2008 | Mirakyan et al. | |
| 2009/0062157 A1 | 3/2009 | Munoz, Jr. et al. | |
| 2012/0132421 A1 | 5/2012 | Loiseau et al. | |
| 2012/0285692 A1 | 11/2012 | Potapenko et al. | |
| 2013/0081813 A1 | 4/2013 | Liang et al. | |
| 2014/0116701 A1 | 5/2014 | Tang | |
| 2014/0116703 A1 | 5/2014 | Reddy et al. | |
| 2014/0290945 A1* | 10/2014 | Potapenko | E21B 21/003 166/281 |
| 2014/0323365 A1* | 10/2014 | Kamann | C09K 8/70 507/219 |
| 2015/0126414 A1* | 5/2015 | Abe | C09K 8/12 507/117 |
| 2015/0361326 A1* | 12/2015 | Masaki | C08K 5/0033 507/219 |
| 2015/0376373 A1 | 12/2015 | Shoji et al. | |
| 2016/0222752 A1* | 8/2016 | Fripp | E21B 33/12 |
| 2016/0230074 A1 | 8/2016 | Potapenko et al. | |

OTHER PUBLICATIONS

International Search Report and Written Opinion issued in International Patent Appl. No. PCT/US2015/059971 dated Feb. 29, 2016; 13 pages.
Office Action issued in Russian Patent Appl. No. 2017120479 dated May 17, 2018; 11 pages (with English translation).
Advances in Polymer Science; vol. 157 entitled "Degradable Aliphatic Polyesters," edited by A. C. Albertsson, pp. 1-138, 2002.
Decision on Grant issued in Russian Patent Appl. No. 2017120479 dated Dec. 4, 2018; 12 pages (with English translation).

* cited by examiner

WELL TREATMENTS FOR DIVERSION OR ZONAL ISOLATION

CROSS REFERENCE

This application claims the benefit of U.S. Provisional Application No. 62/080,002, entitled "WELL TREATMENT," filed Nov. 14, 2014, the disclosure of which is hereby incorporated herein by reference.

BACKGROUND

The statements in this section merely provide background information related to the present disclosure and may not constitute prior art.

Some embodiments relate to methods applied to a well bore penetrating a subterranean formation.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

Hydraulic and acid fracturing of horizontal wells as well as multi-layered formations frequently requires using diverting techniques in order to enable fracturing redirection between different zones. The list of these diverting methods includes, but not limited to, using mechanical isolation devises such as packers and well bore plugs, setting bridge plugs, pumping ball sealers, pumping slurred benzoic acid flakes and removable/degradable particulates. As well, other treatment may require use of diverting techniques.

Treatment diversion with particulates is typically based on bridging of particles of the diverting material behind casing and forming a plug by accumulating the rest of the particles at the formed bridge. Several typical problems related to treatment diversion with particulate materials are: reducing bridging ability of diverting slurry during pumping because of dilution with well bore fluid (interface mixing), necessity of using relatively large amount of diverting materials, and poor stability of some diverting agents during pumping and during subsequent treatment stage.

Diversion involving degradable particles has become popular in the industry since it enables better control of the producing fractures and thus improved hydrocarbon recovery. Different materials have been used with different degree of success; however, some challenges remain particularly at high temperature since the kinetics of degradation are still difficult to control. Methods disclosed herewith offer innovative way to create diverting techniques, zonal isolation or techniques thereof.

SUMMARY

In aspects, methods of treating a subterranean formation penetrated by a well bore are disclosed. The methods provide a treatment fluid including non-homogeneous particulates comprising a degradable material and a stabilizer.

In aspects the treatment fluid comprises a blend, the blend including a first amount of particulates having a first average particle size between about 3 mm and 2 cm and a second amount of particulates having a second average size between about 1.6 and 20 times smaller than the first average particle size or a second amount of flakes having a second average size up to 10 times smaller than the first average particle size; introducing the treatment fluid into the well bore; and creating a plug with the treatment fluid. Also in another embodiment, the second average size is between about 2 and 10 times smaller than the first average particle size.

In further aspects, methods of treating a subterranean formation penetrated by a well bore are disclosed. The well bore may contain a casing and at least one hole in the casing, the hole having a diameter. The methods provide a treatment fluid including non-homogeneous particulates comprising a degradable material and a stabilizer. Said particles may be part of a blend which has a first amount of particulates having a first average particle size between about 50 to 100% of the diameter and a second amount of particulates having a second average size between about 1.6 and 20 times smaller than the first average particle size or a second amount of flakes having a second average size up to 10 times smaller than the first average particle size; introducing the treatment fluid into the hole; creating a plug with said treatment fluid behind casing in the vicinity to the hole or in the hole; and removing the plug. Also, in embodiments, the second average size is between about 2 and 10 times smaller than the first average particle size.

In yet further aspects, methods of fracturing a subterranean formation penetrated by a well bore are disclosed. The well bore contains a casing and at least one hole on said casing, the hole having a diameter. The methods provide a diverting fluid including non-homogeneous particulates comprising a degradable material and stabilizer. The non-homogeneous particles may be part of a blend having a first amount of particulates with a first average particle size between about 50 to 100% of said diameter and a second amount of particulates having a second average size between about 1.6 and 20 times smaller than the first average particle size or a second amount of flakes having a second average size up to 10 times smaller than the first average particle size; introducing the diverting fluid into the hole; creating a diverting plug utilizing the diverting fluid behind casing in the vicinity to the hole or in the hole; fracturing the subterranean formation; and removing the diverting plug. Also in embodiments, the second average size is between about 2 and 10 times smaller than the first average particle size.

DETAILED DESCRIPTION

Figure 1:
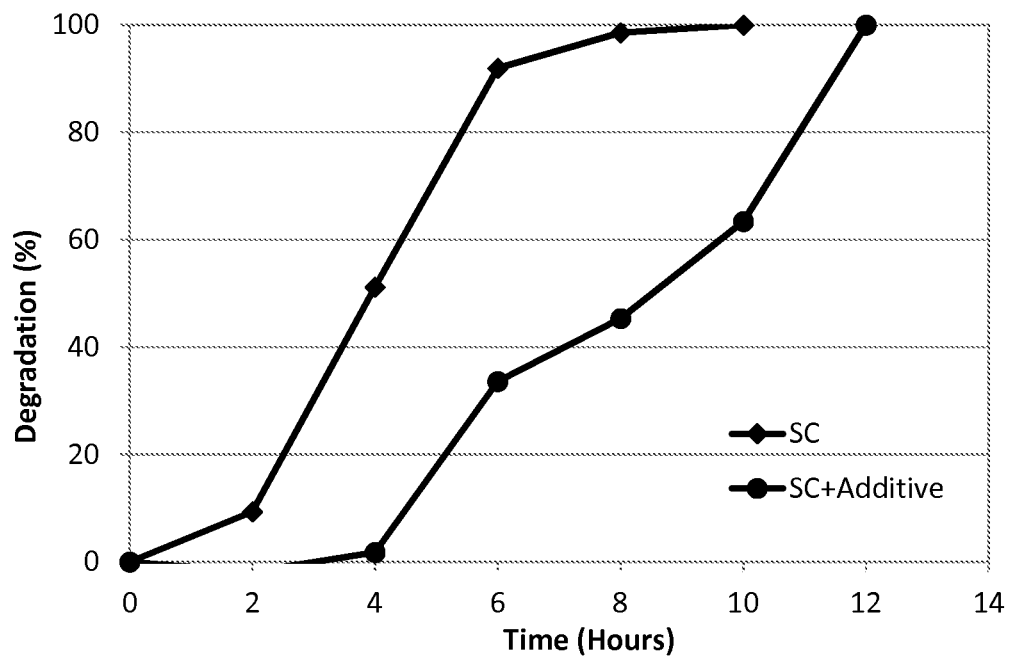
FIG. 1 shows the hydrolysis rate of degradable material depending with and without stabilizer.

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating some embodiments and should not be construed as a limitation to the scope and applicability. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from a hydrocarbon reservoir. The fracturing methods otherwise use conventional techniques known in the art.

The term "particulate" or "particle" refers to a solid 3D object with maximal dimension significantly less than 1 meter. Here "dimension" of the object refers to the distance between two arbitrary parallel planes, each plane touching the surface of the object at at least one point. The maximal dimension refers to the biggest distance existing for the object between any two parallel planes and the minimal dimension refers to the smallest distance existing for the object between any two parallel planes. In some embodiments, the particulates used are with a ratio between the maximal and the minimal dimensions (particle aspect ratio x/y) of less than 5 or even of less than 3.

The term "flake" refers to special type of particulate as defined above. The flake is a solid 3D object having a thickness smaller than its other dimensions, for example its length and width. Flake aspect ratios (diameter/thickness, length/thickness, width/thickness, etc. . . . ) may be in the range of from about 5 to about 50 or more. For the flake, inventors define the flake aspect ratio as the ratio of the length or width to the thickness. Any suitable ratio of length to width may be used.

For the purposes of the disclosure, particles and flakes are non-homogeneous which shall be understood in the context of the present disclosure as made of at least a continuous phase of degradable material containing a discontinuous phase of stabilizer. Non-homogeneous in the present disclosure also encompasses composite materials also sometimes referred to as compounded material. The non-homogeneous particles or flakes may be supplemented in the fluid with further homogeneous structure.

The term "particle size", "particulate size" or "flake size" refers to the diameter (D) of the smallest imaginary circumscribed sphere which includes such particulate or flake.

The term "average size" refers to an average size of solids in a group of solids of each type. In each group j of particles or flakes average size can be calculated as mass-weighted value $$L_j = \frac{\sum_{i=1}^{N} l_i m_i}{\sum_{i=1}^{N} m_i}$$

Where N—number of particles or flakes in the group, $l_i$, (i=1 . . . N)—sizes of individual particles or flakes; $m_i$ (i=1 . . . N)—masses of individual particles or flakes.

The term "hole" refers to a 2D object of any geometry defined only by its perimeter. The term "hole diameter" or "hole size" refers to the diameter of the biggest imaginary circle which is included in such hole.

The determination of the optimal particles size in the blend may be made as described in US patent Application No 2012-0285692 incorporated herein by reference in its entirety.

While the embodiments described herewith refer to well treatment it is equally applicable to any well operations where zonal isolation is required such as drilling operations, workover operations etc.

A method of treatment for diversion or for temporally zonal isolation is disclosed. The method uses a composition made of blends of particles or blends of particles and flakes. According to an embodiment, the size of the largest particles or flakes in the blends is slightly smaller than the diameter of perforation holes in the zone to isolate or divert. According to a further embodiment, the size of the particles or flakes in the blends is larger than an average width of the void intended to be closed or temporally isolated. The average width of the void is the smallest width of the void after the perforation hole or another entry in such void, at 10 cm, at 20 cm, at 30 cm or at 50 cm or at 500 cm (when going into the formation from the well bore). Such void may be a perforation tunnel, hydraulic fracture or wormhole. Introducing such blends composition into perforation holes results in jamming largest particles in the voids in the proximity of the well bore. Thereafter there is an accumulation of other particles on the formed bridge. In one embodiment, the ratio between particles and flakes in the blends are designed to reduce permeability of the formed plugs.

According aspect, the blends composition enables zonal isolation by creating plugs in the proximity to well bore. In comparison to traditional treatment diversion techniques, the blends composition requires lower amount of diverting material. As well, the following benefits exist: lower risk of well bore plugging, lower risk of formation damage, and better clean up. In the example where the diverting blend is designed for sealing perforation tunnels (e.g. slick-water treatments) the amount of diverting material required for treatment diversion between several perforation clusters may be as low as several kilograms. Further removal of the diverting material is achieved either by self-degradation at downhole conditions or by introducing special chemical agents or by well bore intervention.

The composition is made of blends of particles or blends of particles and flakes in a carrier fluid. The carrier fluid may be water: fresh water, produced water, seawater. Other non-limiting examples of carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate.

The particle(s) or the flake(s) can be embodied as proppant. Proppant selection involves many compromises imposed by economical and practical considerations. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated (curable), or pre-cured resin coated. Proppants and gravels in the same or different wells or treatments can be the same material and/or the same size as one another and the term proppant is intended to include gravel in this disclosure. In some embodiments, irregular shaped particles may be used. International application WO 2009/088317 discloses a method of fracturing with a slurry of proppant containing from 1 to 100 percent of stiff, low elasticity, low deformability elongated particles. US patent application 2008/0000638 discloses proppant that is in the form of generally rigid, elastic plate-like particles having a maximum to minimum dimension ratio of more than about 5, the proppant being at least one of formed from a corrosion resistant material or having a corrosion resistant material formed thereon. Each of the above are herein incorporated by reference.

As mentioned earlier the particulates or the blends contain non-homogeneous particulates made of at least a degradable material and a stabilizer.

Non-limiting examples of degradable materials that may be used include certain polymer materials that are capable of generating acids upon degradation. These polymer materials may herein be referred to as "polymeric acid precursors." These materials are typically solids at room temperature. The polymeric acid precursor materials include the polymers and oligomers that hydrolyze or degrade in certain chemical environments under known and controllable conditions of temperature, time and pH to release organic acid molecules that may be referred to as "monomeric organic acids." As used herein, the expression "monomeric organic acid" or "monomeric acid" may also include dimeric acid or acid with a small number of linked monomer units that function similarly to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxbutyric acid, referred to as polyhydroxybutyrate; 2-hydroxyvaleric acid, referred to as polyhydroxyvalerate; epsilon caprolactone, referred to as polyepsilon caprolactone or polyprolactone; the polyesters obtained by esterification of hydroxyl aminoacids such as serine, threonine and tyrosine; and the copolymers obtained by mixtures of the monomers listed above. A general structure for the above-described homopolyesters is:

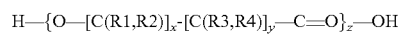

where,
R1, R2, R3, R4 is either H, linear alkyl, such as $CH_3$, $CH_2CH_3$ $(CH_2)_nCH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);
x is an integer between 1 and 11;
y is an integer between 0 and 10; and
z is an integer between 2 and 50,000.

In the appropriate conditions (pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355, which are herein incorporated by reference.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occuring aminoacids are L-aminoacids. Among the 20 most common aminoacids the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number averaged molecular weights (Mn) of up to about 100,000 and weight averaged molecular weights (Mw) of up to about 200,000, although any polylactide (made by any process by any manufacturer) may be used. Those available from NatureWorks, LLC typically have crystalline melt temperatures of from about 120 to about 170° C., but others are obtainable. Poly(d,l-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly(lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

Amorphous polymers may be useful in certain applications. An example of a commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acids derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terphthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acil chloride, malonyl chloride, fumaroil chloride, maleyl chloride, succinyl chloride, glutaroyl chloride, adipoil chloride, phthaloil chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); polyols such as glycerol. When both a dicarboxylic acid derivative and a dihydroxy compound are used, a linear polyester results. It is understood that when one type of dicaboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular case example, not willing to be comprehensive of all the possible polyester structures one can consider, but just to provide an indication of the general structure of the most simple case one can encounter, the general structure for the linear homopolyesters is:

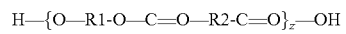

where,
R1 and R2, are linear alkyl, branched alkyl, aryl, alkylaryl groups; and
z is an integer between 2 and 50,000.

Other examples of suitable polymeric acid precursors are the polyesters derived from phtalic acid derivatives such as polyethylenetherephthalate (PET), polybutylentetherephthalate (PBT), polyethylenenaphthalate (PEN), and the like.

In the appropriate conditions (pH, temperature, water content) polyesters like those described herein can "hydrolyze" and "degrade" to yield polycarboxylic acids and polyhydroxy compounds, irrespective of the original polyester being synthesized from either one of the polycarboxylic acid derivatives listed above. The polycarboxylic acid compounds the polymer degradation process will yield are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

Such solid polymeric acid precursor material may be capable of undergoing an irreversible breakdown into fundamental acid products downhole. As referred to herein, the term "irreversible" will be understood to mean that the solid polymeric acid precursor material, once broken downhole, should not reconstitute while downhole, e.g., the material should break down in situ but should not reconstitute in situ. The term "break down" refers to both the two relatively extreme cases of hydrolytic degradation that the solid polymeric acid precursor material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The breakdown of solid polymeric acid precursor materials may or may not depend, at least in part, on its structure. For instance, the presence of hydrolyzable and/or oxidizable linkages in the backbone often yields a material that will break down as described herein. The rates at which such polymers break down are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer breaks down also may be affected by the environment to which the polymer is exposed, e.g., temperature, presence of moisture, oxygen, microorganisms, enzymes, pH, and the like.

Some suitable examples of solid polymeric acid precursor material that may be used include, but are not limited to, those described in the publication of Advances in Polymer Science, Vol. 157 entitled "Degradable Aliphatic Polyesters," edited by A. C. Albertsson, pages 1-138. Examples of polyesters that may be used include homopolymers, random, block, graft, and star- and hyper-branched aliphatic polyesters.

Another class of suitable solid polymeric acid precursor material that may be used includes polyamides and polyimides. Such polymers may comprise hydrolyzable groups in the polymer backbone that may hydrolyze under the conditions that exist in cement slurries and in a set cement matrix. Such polymers also may generate byproducts that may become sorbed into a cement matrix. Calcium salts are a nonlimiting example of such byproducts. Non-limiting examples of suitable polyamides include proteins, polyaminoacids, nylon, and poly(caprolactam). Another class of polymers that may be suitable for use are those polymers that may contain hydrolyzable groups, not in the polymer backbone, but as pendant groups. Hydrolysis of the pendant groups may generate a water-soluble polymer and other byproducts that may become sorbed into the cement composition. A nonlimiting example of such a polymer includes polyvinylacetate, which upon hydrolysis forms water-soluble polyvinylalcohol and acetate salts.

The composition further comprises a stabilizer. Without wishing to be bound by any theory, it is believed that, for example, olyester polymers contain ester bonds which are susceptible to hydrolysis at elevated temperatures in the presence of moisture. The hydrolysis reaction leads to molecular chain scission at the ester bond. As the polymer chains shorten, the molecular weight decreases such that the melt viscosity and intrinsic viscosity also drop. The concentration of carboxyl end groups also increases. The hydrolysis reaction rate begins to become significant at temperatures above 160° C. (320° F.). However, some subterranean formations are at much higher temperature making them practically impossible to be treated.

The inventors have determined that compounding degradable material with a stabilizer may enable treating such subterranean formations. In embodiments the stabilizer is a carbodiimide. Such carbodiimide may for example be obtained by heating an organic diisocyanate in the presence of a carbodiimidation catalyst (1.2). Cyclic phosphine oxides, such as 3-methyl-1-phenyl-3-phosphorene-1-oxide are suitable catalysts.

In embodiments, the stabilizer may be chosen from the groups consisting of mono, poly (Carbodiimide), oligomeric, aromatic, aliphatic, or cyclic carbodiimide compounds. A suitable stabilizer may be N,N-dicyclohexylcarbodiimide, N-ethyl-N(3-dimethylamino) propyl Carbodiimide and its hydrochloride salt. In embodiments, the stabilizer may have a Molecular weight of from about 300 to about 10 000 g/mol, or from about 100 to 5000 g/mol, or about 3000 g/mol.

The particle(s) or the flake(s) can be embodied as material reacting with chemical agents. Some examples of materials that may be removed by reacting with other agents are carbonates including calcium and magnesium carbonates and mixtures thereof (reactive to acids and chelates); acid soluble cement (reactive to acids); polyesters including esters of lactic hydroxylcarbonic acids and copolymers thereof (can be hydrolyzed with acids and bases).

The non-homogeneous particles as described may comprise from 85 to 99.9 wt %, or 90 to 95 wt % of continuous phase (degradable material) and from 0.1 to 15 wt %, or 5 to 10 wt % of discontinuous phase (stabilizer).

The compounded material may be obtained by coextrusion of a mixture of polylactic resin containing the suitable quantity of stabilizer. The mixture is the co-extruded to form the compounded material. Said compounded material may be beads, rods, particles, flakes or fibers and mixtures thereof.

The particle(s) or the flake(s) can be embodied as melting material. Examples of meltable materials that can be melted at downhole conditions hydrocarbons with number of carbon atoms >30; polycaprolactones; paraffin and waxes; carboxylic acids such as benzoic acid and its derivatives; etc. Wax particles can be used. The particles are solid at the temperature of the injected fluid, and that fluid cools the formation sufficiently that the particles enter the formation and remain solid. Aqueous wax are commonly used in wood coatings; engineered wood processing; paper and paperboard converting; protective architectural and industrial coatings; paper coatings; rubber and plastics; inks; textiles; ceramics; and others. They are made by such companies as Hercules Incorporated, Wilmington, Del., U.S.A., under the trade name PARACOL®, Michelman, Cincinnati, Ohio, U.S. A., under the trade name MICHEM®, and ChemCor, Chester, N.Y., U.S.A. Particularly suitable waxes include those commonly used in commercial car washes. In addition to paraffin waxes, other waxes, such as polyethylenes and polypropylenes, may also be used.

The particle(s) or the flake(s) can be embodied as water-soluble material or hydrocarbon-soluble material. The list of the materials that can be used for dissolving in water includes water-soluble polymers, water-soluble elastomers, carbonic acids, rock salt, amines, inorganic salts). List of the materials that can be used for dissolving in oil includes oil-soluble polymers, oil-soluble resins, oil-soluble elastomers, polyethylene, carbonic acids, amines, waxes).

The particle(s) and the flake(s) size are chosen so the size of the largest particles or flakes is slightly smaller than the diameter of the perforation holes in casing and larger than the average width of the voids behind casing (perforation tunnels, fractures or wormholes). By perforation hole, we mean any type of hole present in the casing. This hole can be a perforation, a jetted hole, hole from a slotted liner, port or any opening in a completion tool, casing fluid exit point. According to a further embodiment, the size of particles or flakes in the blend is designed for reducing permeability of the plugs in the narrow voids behind casing (perforation tunnels, fractures or wormholes). In general the particle or flake used will have an average particle size of less than several centimeters, preferably less than 2 cm, and more preferably less than 1 cm. In one embodiment, some particle or flake will have an average particle size of from about 0.04 mm to about 4.76 mm (about 325 to about 4 U.S. mesh), preferably from about 0.10 mm to about 4.76 mm (about 140 to about 4 U.S. mesh), more preferably from about 0.15 mm to about 3.36 mm (about 100 to about 6 U.S. mesh) or from about 2 mm to about 12 mm.

According to a further embodiment, the particles blend or the particles/flakes blend composition contains particles or flakes with different particles/flakes size distribution. In one embodiment, the composition comprises particulate materials with defined particles size distribution. On example of realization is disclosed in U.S. Pat. No. 7,784,541, herewith incorporated by reference in its entirety.

In certain embodiments, the selection of the size for the first amount of particulates is dependent upon the characteristics of the perforated hole as described above: the size of the largest particles or flakes is slightly smaller than the diameter of the perforation holes in casing. In certain further embodiments, the selection of the size of the first amount of particulates is dependent upon the void behind casing: the size of the particles is larger than the average width of the voids behind casing (perforation tunnels, fractures or wormholes). In certain further embodiments, the selection of the size for the first amount of particulates is dependent upon the characteristics of the perforated hole and the void behind casing: the size of the largest particles or flakes is slightly smaller than the diameter of the perforation holes in casing and larger than the average width of the voids behind casing (perforation tunnels, fractures or wormholes). In certain further embodiments, the selection of the size for the first amount of particulates is dependent upon the characteristics of the desired fluid loss characteristics of the first amount of particulates as a fluid loss agent, the size of pores in the formation, and/or the commercially available sizes of particulates of the type comprising the first amount of particulates. The first average particle size is between about 100 micrometers and 2 cm, or between about 100 micrometers and 1 cm or between about 400 micrometers and 1000 micrometers, or between about 3000 micrometers and 10000 micrometers, or between about 6 millimeters and 10 millimeters, or between about 6 millimeters and 8 millimeters. Also in some embodiments, the same chemistry can be used for the first average particle size. Also in some embodiments, different chemistry can be used for the same first average particle size: e.g. in the first average particle size, half of the amount is proppant and the other half is resin coated proppant.

In certain embodiments, the selection of the size for the second amount of particulates is dependent upon the characteristics of the desired fluid loss characteristics of the second amount of particulates as a fluid loss agent, the size of pores in the formation, and/or the commercially available sizes of particulates of the type comprising the second amount of particulates.

In certain embodiments, the selection of the size of the second amount of particulates is dependent upon maximizing or optimizing a packed volume fraction (PVF) of the mixture of the first amount of particulates and the second amount of particulates. The packed volume fraction or packing volume fraction (PVF) is the fraction of solid content volume to the total volume content. The particles size distribution required for maximizing PVF in narrow slot may be different from the particles size distribution required for maximizing PVF in a continuum system. Therefore, in certain embodiments, the selection of the size of the second amount of particulates is dependent upon maximizing or optimizing a packed volume fraction (PVF) of the mixture of the first amount of particulates and the second amount of particulates in narrow voids between 2 mm and 2 cm. In certain embodiments, the selection of the size of the second amount of particulates is dependent upon maximizing or optimizing a packed volume fraction (PVF) of the mixture of the first amount of particulates and the second amount of particulates in a fracture or slot with width of less than 20 mm. A second average particle size of between about two to ten times smaller than the first amount of particulates contributes to maximizing the PVF of the mixture or the mixture placed in the void to plug, or the mixture placed in a fracture or slot with width of less than 20 mm, but a size between about three to twenty times smaller, and in certain embodiments between about three to fifteen times smaller, and in certain embodiments between about three to ten times smaller will provide a sufficient PVF for most storable compositions. Further, the selection of the size of the second amount of particulates is dependent upon the composition and commercial availability of particulates of the type comprising the second amount of particulates. In certain embodiments, the particulates combine to have a PVF above 0.74 or 0.75 or above 0.80. In certain further embodiments the particulates may have a much higher PVF approaching 0.95. In embodiments, all the different particle sizes are compounded polymer containing light burned MgO. In embodiments, only one size is compounded and the others are regular polymer. In embodiments, the largest particles only are compounded.

In certain embodiments, the selection of the size for the second amount of flakes is dependent upon the characteristics of the desired fluid loss characteristics of the second amount of flakes as a fluid loss agent, the size of pores in the formation, and/or the commercially available sizes of flakes of the type comprising the second amount of flakes. The flake size is in the range of 10-100% of the size of the first amount of particulate, more preferably 20-80% of the size of the first amount of particulate.

In certain embodiments, the selection of the size of the second amount of flakes is dependent upon maximizing or optimizing a packed volume fraction (PVF) of the mixture of the first amount of particulates and the second amount of flakes. The packed volume fraction or packing volume fraction (PVF) is the fraction of solid content volume to the total volume content. In certain embodiments, the selection of the size of the second amount of flakes is dependent upon maximizing or optimizing a packed volume fraction (PVF) of the mixture of the first amount of particulates and the second amount of flakes in narrow voids between 3 mm and 2 cm. In certain embodiments, the selection of the size of the second amount of flakes is dependent upon maximizing or optimizing a packed volume fraction (PVF) of the mixture of the first amount of particulates and the second amount of flakes in a fracture or slot with width of less than 20 mm. In certain embodiments, PVF may not necessarily the criterion for selecting the size of flakes.

In certain further embodiments, the selection of the size for the second amount of particulates/flakes is dependent upon the characteristics of the void behind casing and upon maximizing a packed volume fraction (PVF) of the mixture of the first amount of particulates and the second amount of particulates/flakes as discussed above. Also in some embodiments, the same chemistry can be used for the second average particle/flake size. Also in some embodiments, different chemistry can be used for the same second average particle size: e.g. in the second average particle size, half of the amount is PLA and the other half is PGA.

In certain further embodiments, the composition further includes a third amount of particulates/flakes having a third average particle size that is smaller than the second average particle/flake size. In certain further embodiments, the composition may have a fourth or a fifth amount of particles/ flakes. Also in some embodiments, the same chemistry can be used for the third, fourth, or fifth average particle/flake size. Also in some embodiments, different chemistry can be used for the same third average particle size: e.g. in the third average particle size, half of the amount is PLA and the other half is PGA. For the purposes of enhancing the PVF of the composition, more than three or four particles sizes will not typically be required. However, additional particles may be added for other reasons, such as the chemical composition of the additional particles, the ease of manufacturing certain materials into the same particles versus into separate particles, the commercial availability of particles having certain properties, and other reasons understood in the art.

In certain further embodiments, the composition further has a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifying agent include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent particulate-suspension ability even though they are more expensive than guar derivatives and therefore have been used less frequently, unless they can be used at lower concentrations.

In other embodiments, the viscosifying agent is made from a crosslinkable, hydratable polymer and a delayed crosslinking agent, wherein the crosslinking agent comprises a complex comprising a metal and a first ligand selected from the group consisting of amino acids, phosphono acids, and salts or derivatives thereof. Also the crosslinked polymer can be made from a polymer comprising pendant ionic moieties, a surfactant comprising oppositely charged moieties, a clay stabilizer, a borate source, and a metal crosslinker. Said embodiments are described in U.S. Patent Publications US2008-0280790 and US2008-0280788 respectively, each of which are incorporated herein by reference.

The viscosifying agent may be a viscoelastic surfactant (VES). The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants have the formula:

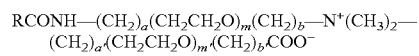

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. In some embodiments, a zwitterionic surfactants of the family of betaine is used.

Exemplary cationic viscoelastic surfactants include the amine salts and quaternary amine salts disclosed in U.S. Pat. Nos. 5,979,557, and 6,435,277 which are hereby incorporated by reference. Examples of suitable cationic viscoelastic surfactants include cationic surfactants having the structure:

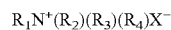

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

In some embodiments, the carrier fluid may optionally further comprise fibers. The fibers may be straight, curved, bent or undulated. Other non-limiting shapes may include hollow, generally spherical, rectangular, polygonal, etc. Fibers or elongated particles may be used in bundles. The fibers may have a length of less than about 1 mm to about 30 mm or more.

In embodiments the fibers may have a length of 12 mm or less with a diameter or cross dimension of about 200 microns or less, with from about 10 microns to about 200 microns being typical. For elongated materials, the materials may have a ratio between any two of the three dimensions of greater than 5 to 1. In certain embodiments, the fibers or elongated materials may have a length of greater than 1 mm, with from about 1 mm to about 30 mm, from about 2 mm to about 25 mm, from about 3 mm to about 20 mm, being typical. In certain applications the fibers or elongated materials may have a length of from about 1 mm to about 10 mm (e.g. 6 mm). The fibers or elongated materials may have a diameter or cross dimension of from about 5 to 100 microns and/or a denier of about 0.1 to about 20, more particularly a denier of about 0.15 to about 6.

The fiber may be formed from a degradable material or a non-degradable material. The fiber may be organic or inorganic. Non-degradable materials are those wherein the fiber remains substantially in its solid form within the well fluids. Examples of such materials include glass, ceramics, basalt, carbon and carbon-based compound, metals and metal alloys, etc. Polymers and plastics that are non-degradable may also be used as non-degradable fibers. These may include high density plastic materials that are acid and oil-resistant and exhibit a crystallinity of greater than 10%. Other non-limiting examples of polymeric materials include nylons, acrylics, styrenes, polyesters, polyethylene, oil-resistant thermoset resins and combinations of these.

Degradable fibers may include those materials that can be softened, dissolved, reacted or otherwise made to degrade within the well fluids. Such materials may be soluble in aqueous fluids or in hydrocarbon fluids. Oil-degradable particulate materials may be used that degrade in the produced fluids. Non-limiting examples of degradable materials may include, without limitation, polyvinyl alcohol, polyethylene terephthalate (PET), polyethylene, dissolvable salts, polysaccharides, waxes, benzoic acid, naphthalene based materials, magnesium oxide, sodium bicarbonate, calcium carbonate, sodium chloride, calcium chloride, ammonium sulfate, soluble resins, and the like, and combinations of these. Degradable materials may also include those that are formed from solid-acid precursor materials. These materials may include polylactic acid (PLA), polyglycolic acid (PGA), carboxylic acid, lactide, glycolide, copolymers of PLA or PGA, and the like, and combinations of these. Such materials may also further facilitate the dissolving of the formation in the acid fracturing treatment. When degradable fibers are being used, they may optionally also be a compounded material containing the stabilizer.

Also, fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

In some embodiments, the carrier fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The compounded material may further plasticizer, nucleation agent, flame retardant, antioxidant agent, or desiccant.

The composition may be used for carrying out a variety of subterranean treatments, including, but not limited to, drilling operations, fracturing treatments, diverting treatments, zonal isolation and completion operations (e.g., gravel packing). In some embodiments, the composition may be used in treating a portion of a subterranean formation. In certain embodiments, the composition may be introduced into a well bore that penetrates the subterranean formation as a treatment fluid. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the well bore.

Methods of wellsite and downhole delivery of the composition are the same as for existing particulate diverting materials. Typically such particulate materials are introduced in the pumping fluid and then displaced into the perforations at high pumping rate. The list of injecting equipment may include various dry additive systems, flow-through blenders etc. In one embodiment the blends of particles may be batch missed and then introduced into the treating fluid in slurred form. Simple flow-through injecting apparatuses may also be used. In one embodiment the composition may be delivered downhole in a bailer or in a tool comprising bailer and a perforation gun as described in US Patent Application 2008/0196896 incorporated herewith by reference. Other way of delivery of the composition can be envisioned for example with a wireline tool, a drill string, through a slickline, with a coil tubing or microcoil, with a downhole tool or any type of other device introduced downhole and able to deliver the composition at a defined location. A microcoil or Microhole Coiled Tubing Drilling Rig (MCTR) is a tool capable of performing an entire "grass-roots" operation in the 0-5000 ft true vertical depth range including drilling and casing surface, intermediate, and production and liner holes.

As soon as the volume of diverting blend required for treatment diversion is relatively low there is a risk that particles in the blend will be separated during pumping through the well bore. It may result in poorer treatment diversion because of forming plugs of higher permeability than expected. To avoid this situation long slugs with low concentration of diverting blends may be introduced in the treating fluid for minimizing the risk of particles separation in the main amount of the pumped blend. In one other embodiment, to avoid this situation diverting blends may be pumped in long slugs at low concentrations which will make volume of the diverting stage comparable with the volume of the well bore. For example for wells with well bore volume of 200 bbl (32 m$^3$) the volumes of the diverting stage that minimizes the risk of particles separation may be in the range of 20-100 bbl (3.2-16 m$^3$). For 5-25 kg of diverting material it corresponds to the range of concentrations of 0.3-8 kg/m$^3$.

Creating plugs of the proposed diverting blends happens by accumulating particles in the void space behind casing. Examples of such voids may be perforation tunnels, hydraulic fractures or wormholes. Plug creation consists of two steps. In the first step some largest particles in the diverting blend jam in the void creating a bridge. During the next step other particles are being accumulated at the formed bridge resulting in plug formation.

After treatment, the created plugs are removed. There are several methods that may be applied for removal of the created plugs. If the composition comprises degradable materials, self-degradation will occur. If the composition comprises material reacting with chemical agents, those are removed by reacting with other agents. If the composition comprises melting material, melting may result in reduction in mechanical stability of the plug. If the composition comprises water soluble or hydrocarbon soluble materials. Plug removal may be achieved through physical dissolution of at least one of the components of the diverting blend in the surrounding fluid. Solubility of the mentioned components may be in significant dependence on temperature. In this situation post-treatment temperature recovery in the sealed zone may trigger the removal of the sealer. Disintegration of at least one component of the composition may occur. Plug removal may be also achieved through disintegration of the sealer into smaller pieces that will be flushed away. List of possible materials that may possess disintegration include plastics such as PLA, polyamides and composite materials comprising degradable plastics and non-degradable fine solids. It worth to mention that some of degradable material pass disintegration stage during degradation process. Example of it is PLA which turns into fragile materials before complete degradation.

As mentioned earlier, the non-homogeneous particles are particularly useful for high temperature wellbore treatment. High temperature in the present context encompasses temperatures of from about 135° C. (275° F.) to 250° C. (482° F.), or 149° C. (300° F.) to about 204° C. (400° F.).

To facilitate a better understanding, the following examples of embodiments are given. In no way should the following examples be read to limit, or define, the scope of the overall disclosure.

EXAMPLES

A series of experiments were conducted to demonstrate the methods of treatment.

Example 1

A stereo-complex of poly lactic acid (PLA) available as INGEO™ from Nature Works, Llc (USA) was compounded with a stabilizer. The stabilizer used was a polymeric Carbodiimide with a minimum Carbodiimide content of 13 wt %, available as Stabaxol P™ from Rhein Chemie (Germany). The addition of the stabilizer to the PLA resin was be melting. Once melted, the mixture was extruded and cut into rods shape of 2-3 mm length with 2 mm diameter. Both samples were co-extruded at similar.

Degradation degree of both samples was measured in Distilled water, at a concentration 1 wt % of compounded degradable material. Sample was kept at 176° C. (350° F.) temperature with weight change monitored every 2 hours. The degradation curves are available from FIG. 1. A comparative test was run with PLA not compounded with the stabilizer. The temperature resistance is clearly apparent from the degradation curves.

Example 2

In this example, PLA samples were BIOFRONT PLA commercially available from Teijin, Japan, and which was compounded with a carbodiimide compound having cyclic structure. Sample maker as "Biofront+additive II" has higher percentage of stabilizer than the sample "Biofront+ additive", sample labeled as "Biofront" did not contain stabilizer.

Figure 2:
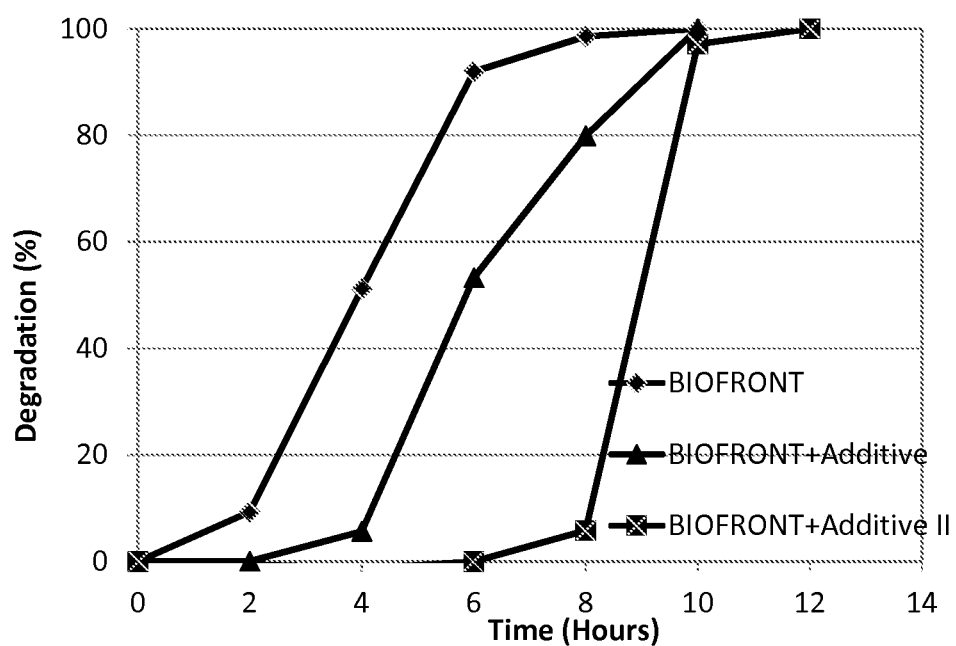
FIG. 2 compares the hydrolysis of degradable at various concentration of stabilizer.

Degradation degree of the samples was measured in distilled water, sample concentration 1 wt %. Samples were kept at test 176° C. (350° F.) temperature with weight change monitored every 2 hours. The degradation curves are available from FIG. 2. As apparent, increasing the concentration of stabilizer does help delaying the hydrolysis of the samples.

Example 3

In this example the series of samples were produced using a Thermo Scientific bench top twin screw extruder. The base polymer was poly lactic acid (PLA) available as 6060 D INGEO™ from Nature Works, Llc (USA). The stabilizer used was a polymeric Carbodiimide with a minimum Carbodiimide content of 13 wt %, available as Stabaxol P™ from Rhein Chemie (Germany). # samples were made, one without stabilizer, one with 2 wt % of Stabaxol P™ and one with 4 wt % of Stabaxol P™.

Figure 3:
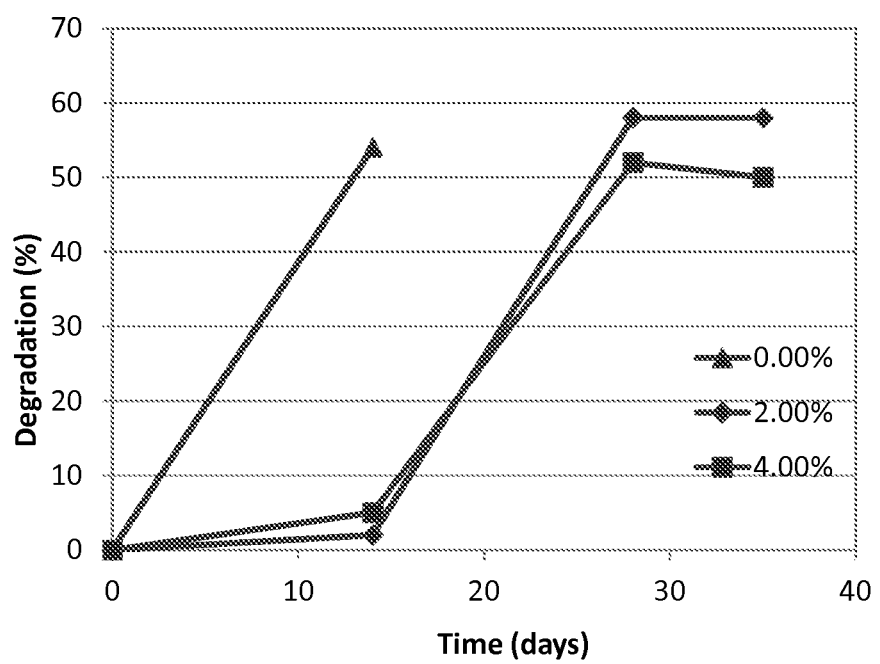
FIG. 3 shows the degradation of thermoplastic without stabilizer and with different concentrations of stabilizers over long period of time.

Degradation degree of samples was measured in Distilled water, sample concentration 1 wt %. Samples were kept at test temperature of 60° C. (140° F.) with weight change measured on day 14, 28 and 35, also pH level of the solution was monitored, which is an indicator of polymer degradation and formation of lactides. A lower temperature of measurement was chosen in case hydrolysis should be delayed for a long period of time. Results are available from FIG. 3. The delaying effect of the stabilizer is clearly evidenced.

The foregoing disclosure and description is illustrative and explanatory, and it can be readily appreciated by those skilled in the art that various changes in the size, shape and materials, as well as in the details of the illustrated construction or combinations of the elements described herein can be made without departing from the spirit of the disclosure.

What is claimed is:

1. A method of treating a subterranean formation penetrated by a well bore, comprising:
    providing a treatment fluid comprising non-homogeneous particulates comprising a continuous phase of degradable material and a discontinuous phase of stabilizer of the degradable material, wherein the non-homogeneous particulates are formed by coextrusion of a mixture of the degradable material and the stabilizer;
    wherein the non-homogenous particulates have a packed volume fraction (PVF) of above 0.74;
    introducing the treatment fluid into the well bore; and,
    creating a plug with the treatment fluid,
    wherein the stabilizer comprises a carbodiimide.

2. The method of claim 1, wherein the treatment fluid contains a blend including a first amount of particulates having a first average particle size between about 3 mm and 2 cm and a second amount of particulates having a second average size between about 1.6 and 20 times smaller than the first average particle size or a second amount of flakes having a second average size up to 10 times smaller than the first average particle size.

3. The method according to claim 2, wherein the blend further comprises fibers.

4. The method according to claim 3, wherein the fibers are compounded fibers containing a degradable material and a stabilizer.

5. The method according to claim 2, wherein the treatment fluid further comprises a third amount of particulates or flakes having a third average size smaller than the second average size.

6. The method of claim 5, wherein the treatment fluid further comprises a fourth and a fifth amount of particulates or flakes having a fourth average size smaller than the third average size, and a fifth average size smaller than the fourth average size.

7. The method of claim 1, wherein the stabilizer is a cyclic carbodiimide.

8. The method of claim 1, wherein the treatment fluid comprises a carrier fluid, and a viscosifying agent or friction reducer.

9. The method of claim 8, wherein the carrier fluid is a treatment fluid selected from the group consisting of slickwater, spacer, mutual solvent, flush, formation dissolving fluid, fracturing fluid, scale dissolution fluid, paraffin dissolution fluid, asphaltene dissolution fluid, diverter fluid, water control agent, chelating agent, viscoelastic diverting acid, self-diverting acid, acid, and mixtures thereof.

10. The method of claim 1, wherein the subterranean formation to be treated is at a temperature of from about 135° C. (275° F.) to 250° C. (482° F.).

11. The method according to claim 1, further comprising removing the plug.

12. The method of claim 1, wherein the degradable material is a polylactic acid material or a polyglycolic acid.

13. The method of claim 1, wherein the method further comprises subjecting the subterranean formation to a fracturing treatment.

14. The method of claim 1, wherein the method further comprises subjecting the subterranean formation to a fracturing treatment after the creating of the plug.

15. A method of treating a subterranean formation of a well bore, wherein the well bore comprises a casing and at least one hole in the casing, the at least one hole having a diameter, the method comprising:
    providing a treatment fluid comprising non-homogeneous particulates comprising a continuous phase of degradable material and a non-continuous phase of stabilizer of the degradable material, wherein the non-homogeneous particulates are formed by coextrusion of a mixture of the degradable material and the stabilizer;
    the non-homogenous particulates having a packed volume fraction (PVF) of above 0.74;
    introducing the treatment fluid into the hole;
    creating a plug of the at least one hole with the treatment fluid; and
    removing the plug,
    wherein the treatment fluid contains a blend including a first amount of particulates having a first average particle size between about 3 mm and 2 cm and a second amount of particulates having a second average size between about 1.6 and 20 times smaller than the first average particle size or a second amount of flakes having a second average size up to 10 times smaller than the first average particle size,
    wherein the stabilizer comprises a carbodiimide.

16. A composition for fluid diversion in a wellbore, comprising:
    non-homogeneous particulates containing a continuous phase of degradable material and a discontinuous phase of stabilizer of the degradable material, formed by coextrusion of a mixture of the degradable material and the stabilizer,
    the non-homogenous particles having a packed volume fraction (PVF) of above 0.74,
    wherein the stabilizer comprises a carbodiimide.

17. The composition of claim 16, wherein the stabilizer is a cyclic carbodiimide.

* * * * *